(12) United States Patent
Lang et al.

(10) Patent No.: US 6,285,938 B1
(45) Date of Patent: Sep. 4, 2001

(54) PRIMER SYSTEM FOR AGRICULTURE PRODUCT DISTRIBUTION MACHINES

(75) Inventors: Francis G. Lang; Robert K. Benneweis; Shane C. Durant; Paul G. Weisberg, all of Saskatoon; Blake R. Neudorf, Langham; David R. Hundeby; Dean J. Mayerle, both of Saskatoon, all of (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/432,053

(22) Filed: Nov. 1, 1999

(51) Int. Cl.$^7$ .............................. G06F 165/00; B05B 1/20
(52) U.S. Cl. ............................ 701/50; 111/174; 111/177; 239/10; 239/161
(58) Field of Search ................................. 701/50; 239/10, 239/161; 111/174, 177, 200

(56) References Cited

U.S. PATENT DOCUMENTS

| | | | |
|---|---|---|---|
| 5,025,951 | | 6/1991 | Hook et al. ............................ 221/13 |
| 5,220,876 | | 6/1993 | Monson et al. ...................... 111/130 |
| 5,310,113 | * | 5/1994 | Cowgur .................................. 239/10 |
| 5,348,226 | * | 9/1994 | Heiniger et al. .......................... 239/1 |
| 5,413,055 | * | 5/1995 | Dern ..................................... 111/130 |
| 5,485,956 | * | 1/1996 | Lenhardt ................................... 239/1 |
| 5,574,657 | * | 11/1996 | Tofte et al. ........................... 364/510 |
| 5,598,794 | * | 2/1997 | Harms et al. ......................... 111/177 |
| 5,621,666 | * | 4/1997 | O'Neall et al. ....................... 364/555 |
| 5,704,546 | * | 1/1998 | Henderson et al. ...................... 239/1 |
| 5,740,746 | * | 4/1998 | Ledermann et al. ................. 111/174 |
| 5,755,302 | * | 5/1998 | Lutz et al. .......................... 180/65.2 |
| 5,755,382 | * | 5/1998 | Skotinkov ............................. 239/161 |
| 5,842,307 | * | 12/1998 | May ........................................ 47/1.7 |

(List continued on next page.)

OTHER PUBLICATIONS

"Precision Beyond Compare" Raven Industries. Brochure
Dickey–John "PCS Precision Control System" Internet page.

*Primary Examiner*—William A. Cuchlinski, Jr.
*Assistant Examiner*—Tuan To
(74) *Attorney, Agent, or Firm*—J. William Stader; Larry W. Miller (57) ABSTRACT

A primer system for agricultural product distribution machines, such as an agricultural air seeder, a precision planter, a sprayer, or the like, includes a tank or a bin for holding the product, a distribution system for conveying and distributing the product from the tank and a driving mechanism for driving the product from the tank into the distribution system at a certain rate. The driving mechanism can run automatically or can be selectively operated, based on commands received from a microcontroller. The microcontroller may receive signals from a user interface and from sensing equipment, such as a ground speed detector, a pressure sensor, a flow metre, or the like. In a regular mode of operation, the controller runs the driving mechanism automatically at a rate calculated based on the signals received from the above mentioned systems. Most agricultural machines have the automated mode of operation of the driving mechanism, conditioned by the ground speed of the tractor being higher than a minimum speed. A bypass mode of operation of the driving mechanism can be selected by pressing a primer button on the user interface. The primer button triggers a bypass signal, instructing the microcontroller to run the driving mechanism at a predetermined dispensing rate, regardless of other factors, such as the detected ground speed. The bypass mode of operation could also be activated upon reception, at the microcontroller, of bypass signals from sensors such as an implement height detector, determining the height of an implement of the agricultural product distribution machine relative to the ground.

11 Claims, 9 Drawing Sheets

U.S. PATENT DOCUMENTS

| | | | |
|---|---|---|---|
| 5,864,781 | * | 1/1999 | White .................................... 702/182 |
| 5,915,313 | * | 1/1999 | Bender et al. ........................ 111/178 |
| 5,924,371 | * | 7/1999 | Flamme et al. ...................... 111/177 |
| 5,936,234 | * | 8/1999 | Thomas et al. ................... 250/222.2 |
| 5,954,323 | * | 9/1999 | Emigh et al. ..................... 270/58.06 |
| 5,967,066 | * | 10/1999 | Giles et al. .......................... 111/119 |
| 6,003,455 | * | 12/1999 | Flamme et al. ...................... 111/200 |
| 6,024,035 | * | 2/2000 | Flamme ............................... 111/178 |
| 6,079,340 | * | 6/2000 | Flamme et al. ...................... 111/178 |
| 6,081,224 | * | 6/2000 | Rosenbrock ......................... 342/104 |

* cited by examiner

PRIMER SYSTEM FOR AGRICULTURE PRODUCT DISTRIBUTION MACHINES

BACKGROUND OF THE INVENTION

The present invention relates to a primer system for agricultural product distribution machines, such as air seeders, precision planters, and sprayers.

Agricultural machines used for applying product over a field will be referred to herein as agricultural product distribution machines. Such machines include seeders, fertilizers, planters, sprayers, and the like. Agricultural product distribution machines must apply the product to be distributed evenly across the entire field. With a fertilizer distributing machine, for example, it is important that each area of the field receive, as accurately as possible, the required amount of fertilizer. The practice of averaging product requirements for an entire field is common. However, averaging product requirements may result in over fertilizing some areas of the field and under fertilizing others.

Technological advances now enable farmers to obtain greater accuracy in product application. For example, yield monitors used in association with a combine measure the amount of grain being harvested as the grain is sent to the bin in the combine. The actual yield of the best and poorest areas can be observed on the monitor. In addition, Global Positioning Systems (GPS) can provide information as to the exact position of the machinery in the field. Yield monitors combined with a GPS receiver, are used to plot yield maps and identify reasons why certain areas have low or high yields, which may be related to nutrient differences. With this information, farmers can then determine whether a certain part of the field might need more fertilizer, less fertilizer or should be treated with a different farming method. Farmers can then apply fertilizer, herbicides, and seed at the rate needed for a particular soil site.

Variable rate systems have been developed to allow operators of agricultural product distribution machines to vary the application rate of the product without leaving the tractor cab. Several manufacturers of agricultural equipment offer variable rate drive mechanisms on their machines. One variable rate hydraulic drive control, disclosed in Canadian patent application No. 2,221,403, essentially consists of an electric motor that provides a rotational drive rate to a hydraulic motor, which controls the product metering mechanism. The electric motor input varies with ground speed, thus providing a consistent rate of metering. Other variable rate drive mechanisms are known.

A typical agricultural seeder includes a product bin and a product distribution system. The product distribution system generally includes a series of hoses and a manifold. Product is dispensed from the bin into the distribution system through a dispensing mechanism, e.g., a metering wheel, at a rate related to the desired application rate of the product onto the field. The dispensing mechanism is typically driven by a variable rate drive system.

All of the above prior art systems have a product dispensing rate related to the ground speed (also known in the art as forward speed) of the agricultural product distribution machine. As the agricultural product distribution machine travels across the field, a sensor detects the ground speed. The variable rate drive mechanism drives the dispensing mechanism accordingly. As the ground speed varies, the dispensing rate varies to maintain a consistent distribution of product.

A common characteristic of many variable rate systems is that the variable rate drive metering mechanism will begin operating only after a minimum ground speed is detected by the sensors, in order to overcome detection errors. For example, a minimum speed of approximately 2 miles per hour is chosen with some known seeders. If a stationary seeder is accelerated to an operating speed, it could take about 2 to 10 seconds for the minimum ground speed to be detected and the metering mechanism to be activated. By this time, the seeder could have travelled up to 30 feet in the field without dispensing any seed. After the metering mechanism starts dispensing seed, the operator has to retrace his path to seed that area.

The time lag between movement of the seeder and the dispensing of seed is inefficient, time consuming, and can cause seeding errors in the field. Other systems, do not require the detection of a minimum ground speed in order for their metering mechanisms to start operating, but there is still a time lag for the product to reach the ground, leading to the same problems. Unused or inaccurately seeded land is wasteful of space and money. It is advantageous for farmers, especially row crop farmers, to use all available land. Accurately dispensed seeds achieve better yields. Similar problems are associated with other agricultural product distribution machines.

In some circumstances, agricultural product distribution machines must be backed into a corner of a field before they can be moved forward and the product distribution process, such as seeding, begins. In such situations, an area may be left unseeded as there is no opportunity for the operator to retract his path.

Similar problems arise when the agricultural product distribution machine may have to slow down below the minimum speed during the product dispensing process.

SUMMARY OF THE INVENTION

The present invention relates to a primer system for agricultural product distribution machines.

According to the invention, there is provided an agricultural product distribution machine comprising: storage means for storing a quantity of agricultural product to be distributed; conveying means for conveying agricultural product from the storage means to the ground surface; and control means for controlling the rate of transfer of the agricultural product from the storage means through the conveying means for distribution to the ground, the control means comprising: an regular operation system for automatically controlling the transfer of agricultural product at a rate dependent on process specific parameters; and a bypass system for controlling the transfer of agricultural product at a pre-determined rate.

According to the invention, there is further provided an air seeder comprising: storage means for storing a quantity of seed to be distributed; conveying means for conveying seed by way of air flow from the storage means through the ground surface; and control means for controlling the rate of transfer of the seed from the storage means through the conveying means for distribution to the ground, the control means comprising: a regular operation system for automatically controlling the transfer of seed at a rate dependent on process specific parameters; and a bypass system for controlling the transfer of seed at a pre-determined rate.

According to the invention, there is further provided a precision planter comprising: storage means for storing a quantity of seed to be distributed; conveying means for conveying seed from the storage means to the ground surface; and control means for controlling the rate of transfer of the seed from the storage means through the conveying means for distribution to the ground, the control means comprising: a regular operation system for automatically controlling the transfer of seed at a rate dependent on process specific parameters; and a bypass system for controlling the transfer of seed at a pre-determined rate.

According to the invention, there is further provided a sprayer comprising: storage means for storing a quantity of fluid to be distributed; conveying means for conveying fluid from the storage means to the ground surface; and control means for controlling the rate of transfer of the fluid from the storage means through the conveying means for distribution to the ground, the control means comprising: a regular operation system for automatically controlling the transfer of fluid at a rate dependent on process specific parameters; and a bypass system for controlling the transfer of fluid at a pre-determined rate.

The agricultural product distribution machine may be, for example, an air seeder, a precision planter, a sprayer, or the like.

In one aspect of the invention, a primer system for agricultural product distribution machines, such as an agricultural air seeder, a precision planter, a sprayer, or the like, includes a tank or a bin for holding the product, a distribution system for conveying and distributing the product from the tank, and a driving mechanism for driving the product from the tank into the distribution system at a certain rate. The driving mechanism can run automatically or can be selectively operated, based on commands received from a microcontroller. The microcontroller may receive signals from a user interface and from sensing equipment, such as a ground speed detector, a pressure sensor, a flow metre, or the like. In a regular mode of operation, the controller runs the driving mechanism automatically at a rate calculated based on the signals received from the above mentioned systems. Most agricultural machines have the automated mode of operation of the driving mechanism, conditioned by the ground speed of the tractor being higher than a minimum speed. In a bypass mode of operation, the driving mechanism can be selectively operated by pressing a primer button on the user interface. The primer button triggers a bypass signal, instructing the microcontroller to run the driving mechanism at a predetermined dispensing rate, regardless of other factors, such as the detected ground speed.

Other advantages, objects, and features of the present invention will be readily apparent to those skilled in the art from a review of the following detailed description of preferred embodiments in conjunction with the accompanying drawings and claims.

BRIEF DESCRIPTION OF THE DRAWINGS

The embodiments of the invention will now be described with reference to the accompanying drawings, in which.

DETAILED DESCRIPTION OF THE PREFERRED EMBODIMENT

Figure 1:
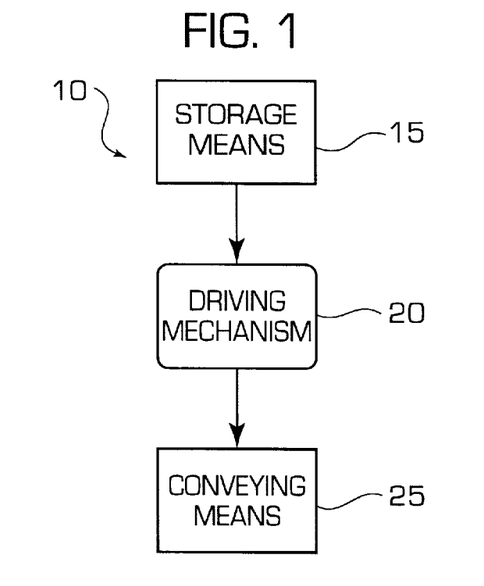
FIG. 1 is a block diagram of a known agricultural product distribution machine.

Referring to FIG. 1, a known product distribution machine 10 generally includes at least one tank or other storage means 15 for holding product, and a distribution system or other conveying means 25 to transmit the product to a desired location. Product is passed from the storage means 15 to the conveying means 25 by a driving mechanism 20.

For simplicity, the invention will be described next in the context of agricultural product distribution machines.

Figure 2:
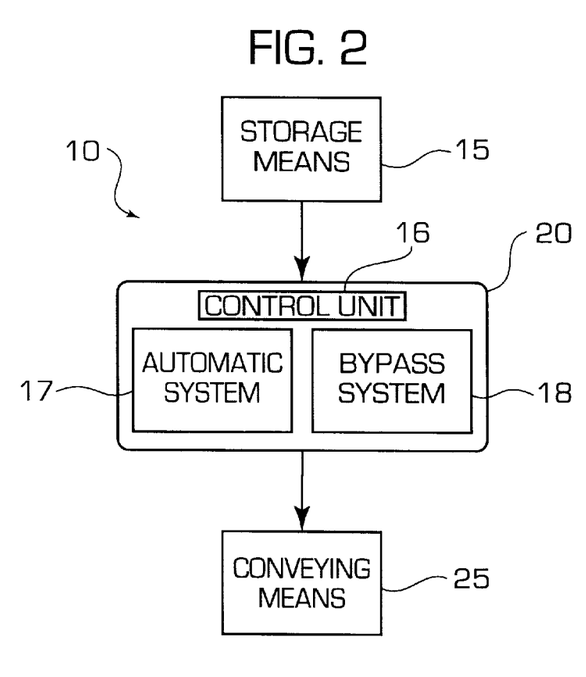
FIG. 2 is a block diagram of a primer system for a agricultural product distribution machine in accordance with an embodiment the present invention.

Referring now to FIG. 2, an agricultural product distribution machine 10 in accordance with the present invention includes a storage means 15, a conveying means 25 and a driving mechanism 20. The driving mechanism 20 includes a control unit 16 to control the rate of transfer of product from the storage means 15 to the conveying means 25, preferably according to the desired rate of product distribution over a ground surface. The control unit 16 controls a regular operation system 17 which automatically transfers product from the storage means 15 to the conveying means 25 at a rate dependent on process specific parameters. The control unit 16 also controls a bypass system 18 that transfers product from the storage means 15 into the distribution system 25 at a predetermined rate.

Figure 3:
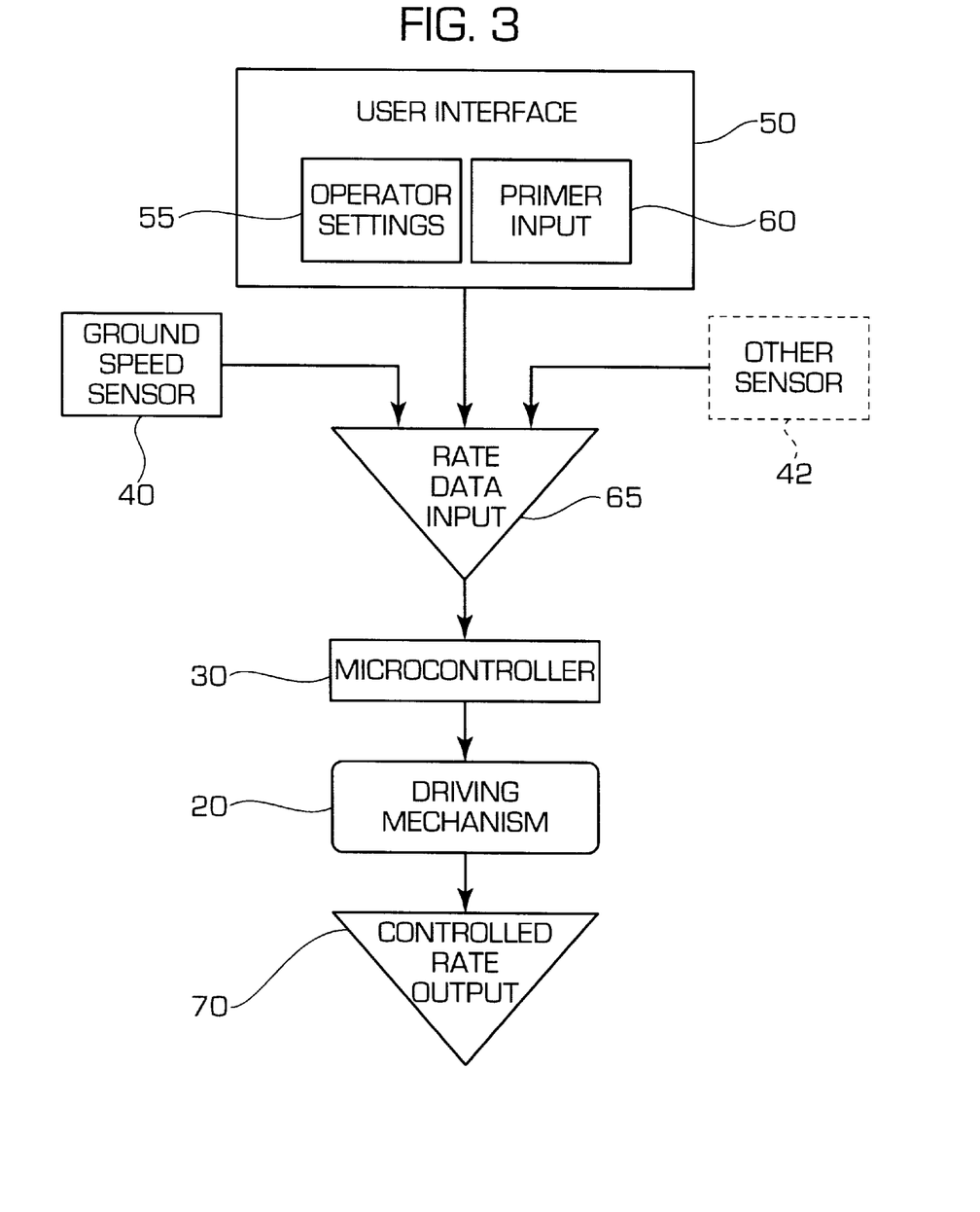
FIG. 3 is a block diagram of a control unit, in accordance with an embodiment of the primer system in FIG. 2.
Figure 4:
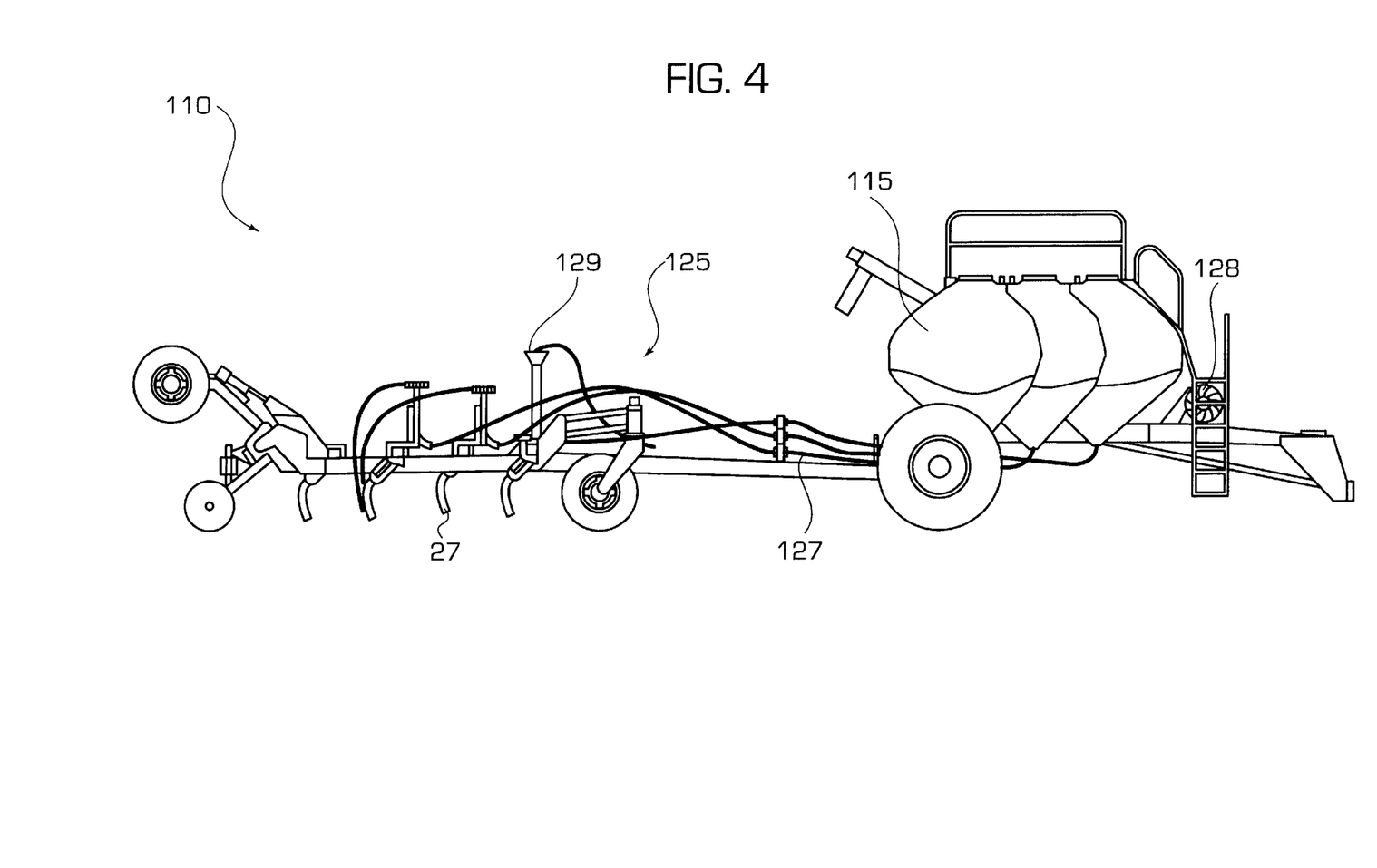
FIG. 4 represents a basic air delivery system.

Referring now to FIG. 3, the control unit includes a microcontroller 30, which enables the driving mechanism 20 to run automatically or to be selectively operated by an operator. Referring also to FIG. 4, an embodiment of the invention is illustrated in the context of a agricultural product distribution machine 10, towed by a vehicle (not shown) in a field onto which product must be applied.

In one embodiment of the invention, the microcontroller 30 receives command signals from a ground speed sensor 40, from a user interface 50 and from other sensors 42. In the embodiment in FIG. 3, the other sensors 42 are optional and, if present, they are part of the bypass system 18 in FIG. 2. One of the functions of the other sensors 42 is to determine conditions in which the bypass system 18 should be active, and to signal such conditions to the microcontroller 30. An operational example of the other sensors 42, within the context of the embodiment of FIG. 3, will be described later on.

The ground speed sensor 40 detects the ground speed or forward speed of the agricultural product distribution machine 10, as the vehicle tows the agricultural product distribution machine 10 across a field.

The user interface 50 allows the operator to monitor and set various parameters relating to the process, such as application rate, location in the field, implement widths, calibration numbers, and the like. Some of the process parameters can be changed through controls or operator settings 55.

A primer input unit 60 comprising one or more buttons or switches on the user interface 50, allows the operator to manually and selectively operate the driving mechanism 20, as will be further described.

The operator settings 55 on the user interface 50 may be buttons or any other input means, such as keys on a keypad, switches, levers, or the like. The user interface 50 is positioned in such way that an operator can control the system 'on-the-go', i.e., while the agricultural product distribution machine 10 is travelling in the field. In a preferred embodiment, the user interface 50 comprises a display unit and a console unit situated in the cab of the vehicle towing the agricultural product distribution machine 10. In an alternative embodiment, the user interface is accessible from other locations remote from the agricultural product distribution machine 10.

Referring to FIG. 3, the ground speed and the data from the user interface 50 are collectively referred to as rate data input 65. The rate data input 65 is processed by the microcontroller 30. Upon processing, the microcontroller 30 activates the driving mechanism 20 which, in turn, drives product from the tank 15 into the distribution system 25 at a controlled rate output 70.

The driving mechanism 20 has at least two modes of operation, which are designated herein as the 'regular mode of operation' and the 'bypass mode of operation'.

During the 'regular mode of operation', the driving mechanism runs automatically at a dispensing rate calculated based on the detected ground speed, on the operator settings, and on other process specific parameters. Therefore, the controlled rate output 70 varies with the rate data input 65 to compensate for ground speed fluctuations and to produce a consistent application of the product onto the field.

In many cases, the driving mechanism 20 functions in its 'regular mode of operation' only when the detected ground speed is above a minimum speed. The value of the minimum ground speed is selected based on various considerations, and can even be set at zero miles per hour.

If desired, the operator can bypass the 'regular mode of operation' of the driving mechanism 20 by activating the driving mechanism 20 to dispense product at a predetermined controlled rate output 70; this is the 'bypass mode of operation'. The 'bypass mode of operation' can be directly selected by the operator through the primer input unit 60. Alternatively, the operator can allow other sensors 42 to automatically determine that conditions necessitating the activation of the bypass mode are met and to send bypass signals to the microcontroller 30, indicating that the driving mechanism should be activated in the 'bypass mode'. For simplicity, the 'bypass mode' will next be described in detail only for the case when its activation takes place directly, through the primer input unit 60. However, it will be appreciated by those skilled in the art that a similar mode of functioning applies to the case when the 'bypass mode' is triggered by means of the other sensors 42.

By pressing a button, for example, on the primer input unit 60, the operator initiates a program that bypasses the input from the ground speed sensor 40 to the driving mechanism 20. In other words, by pressing a primer button on the user interface 50, a bypass signal is sent to the microcontroller 30, which is programmed to start the driving mechanism 20 at a predetermined rate or at a computed rate.

Since the 'regular mode of operation' of the driving mechanism 20 generally depends on the detection of a minimum ground speed, one usually engages the driving mechanism 20 in the 'bypass mode of operation' when the ground speed is below the minimum speed. Among the situations when this condition occurs are: at the beginning of the application process when the vehicle is stationary, when the vehicle is stopped midfield, when the vehicle is backed into a comer, and when crossing waterways or the like.

In one embodiment, the operator may select from a plurality of predetermined rates at which the microcontroller 30 can run the driving mechanism 20, different rates being suited to particular situations. Each rate may have a corresponding primer button on the primer input unit 60 in the cab of the vehicle.

The invention will be described next in the context of three preferred embodiments: air seeding systems, precision planters, and sprayers. The person skilled in the art will recognize that the present invention may be embodied in other types of product distribution machines.

AIR SEEDERS

Figure 5:
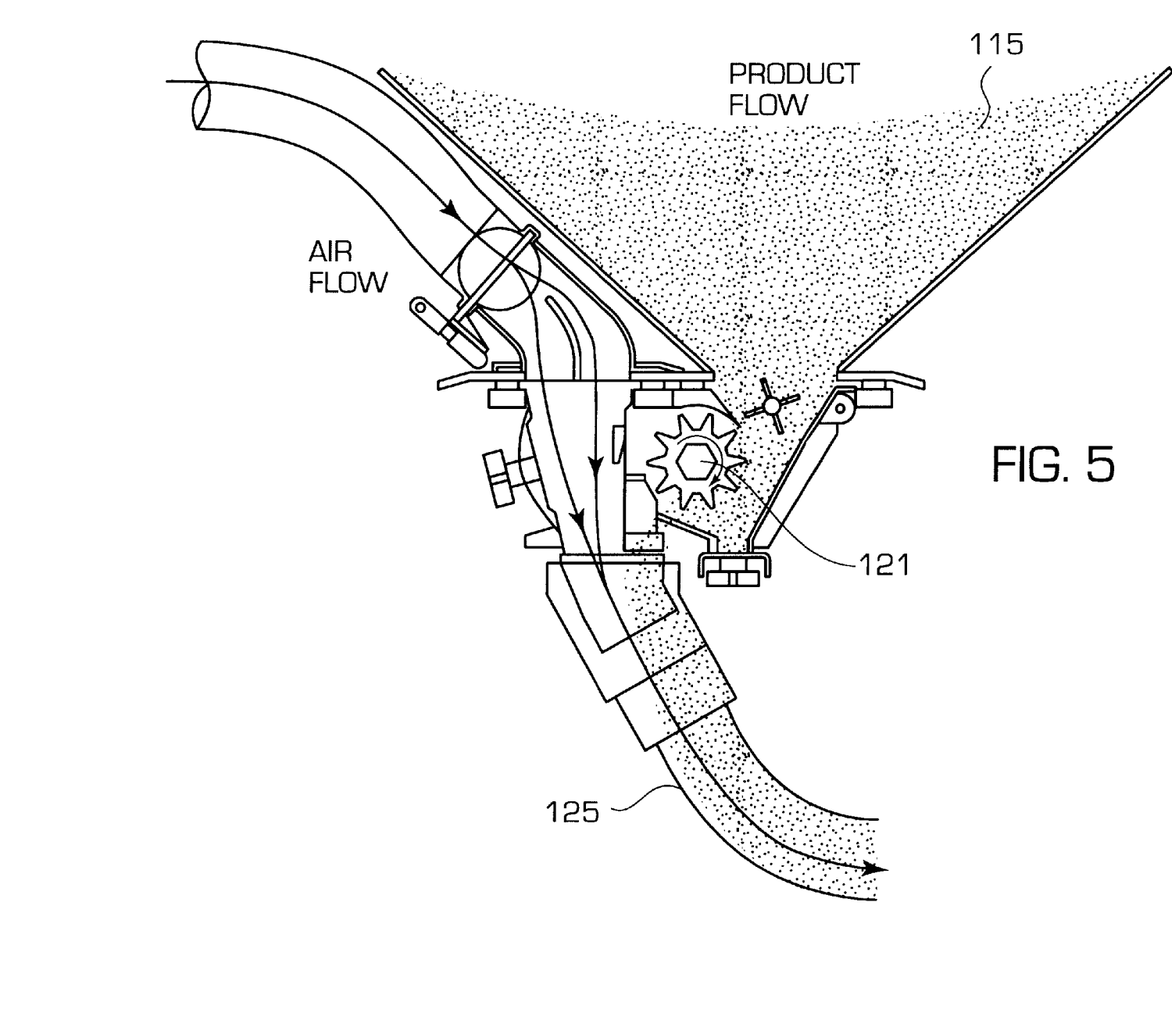
FIG. 5 represents a metering mechanism of the air delivery system in FIG. 3.

FIGS. 4 and 5 depict an air seeder or air cart 110 (which is an agricultural product distribution machine 10) embodying the present invention. The air cart 110 includes an air distribution system 125 (which is a conveying means 25). The air cart 110 also includes a seeding tool 27, which may be a series of ground openers. The air distribution system 125 includes a manifold 127, and in some embodiments a series of hoses. The air cart 110 can be attached to a vehicle, such as a tractor, or it can be built as an integral part of a vehicle. The air cart 110 includes one or more tanks 115 (which is a storage means 15) to hold products like seed and fertilizer. The air cart 10 also includes a driving mechanism 20. The driving mechanism 20 includes a metering system 120 to deliver the appropriate amount of product to the air distribution system 125, and a fan 128.

The metering system 120 controls the dispensing rate of product from the tanks 115 into the air distribution system 125. The dispensing rate of the metering system 120 determines the application rate of product onto the field.

Referring now to FIG. 5, the metering system 120 includes a metering wheel 121 designed to dispense product at a predetermined rate. As product passes through the metering system 120, it is carried by airflow provided by the fan through the manifold 127 to headers 129, where the product is split into several runs and then passes through the ground opener and into the furrow created by the opener.

The metering system 120 is driven automatically by a variable rate drive mechanism. In the case of a metering wheel, the variable rate drive mechanism will rotate the metering wheel at various rates. Many designs of variable rate drive mechanisms are known in the art and could be used in embodiments of the present invention.

The air cart 110 comprises sensing equipment, including a ground speed sensor 40 for detection of the ground speed of the air cart 110. Thus, variations in the ground speed of the air cart 110 may be taken into account when calculating the application rate, so that seeds can be dispensed evenly.

With respect to this embodiment, the 'bypass mode of operation' is selected through the primer input unit 60, which primes the air distribution system 125 of an air seeder, engaging the variable rate drive mechanism to rotate the metering wheel 121 at a predetermined rate. The primer input unit 60 is commonly operated in a situation when the ground speed of the air seeder is below a minimum predetermined ground speed. For example, suppose a farmer is at the beginning of the seeding process, with the tractor stationary in the field. The primer input unit 60 allows the farmer to deposit seeds during the period of time prior to the tractor reaching a predetermined minimum ground speed.

Once the tractor attains the predetermined minimum ground speed, the variable rate drive mechanism rotates the metering wheel automatically at a rate determined by the ground speed. In order to accomplish this, the farmer presses one or several primer input buttons in the cabin of the tractor.

Thus, the farmer bypasses the seed dispensing process, selecting one of several available predetermined rates at which the variable rate drive mechanism rotates the metering wheel. Once the tractor reaches the predetermined minimum ground speed, the seeder may enter the 'regular mode of operation' in which the variable rate drive mechanism rotates the metering wheel at a rate consistent with the ground speed, or it may continue to run in the 'bypass mode of operation' at the selected predetermined rate, according to operator input through the primer input unit 60. The problem of having field areas left unseeded, due to the inability of the variable rate drive mechanism to automatically rotate the wheel, when the seeder travels at a speed below a predetermined minimum ground speed, is thus solved in a time efficient manner.

Figure 6:
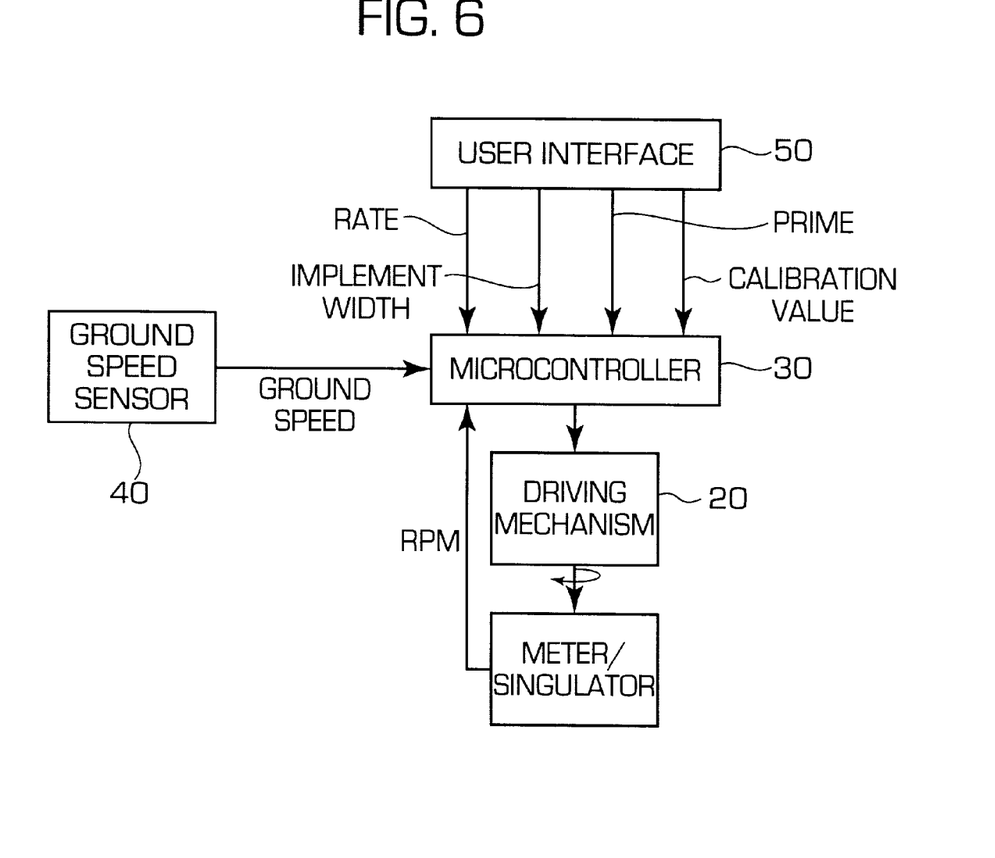
FIG. 6 is a block diagram of a primer system in accordance with an embodiment of the present invention, as it applies to seeders and planters.

FIG. 6 is a block diagram of a system in accordance with the present invention as it applies to seeders and planters. The microcontroller 30 receives signal from the ground speed detector 40 and the user interface 60. A feedback loop returns to the microcontroller 30 the rotation rate of the metering wheel 121 at any moment. Based on this information, the microcontroller 30 calculates the desired rate at any moment and commands the metering wheel 121 to rotate at the desired rate. As previously indicated, the user interface 50 comprises operator setting buttons 55 and priming buttons 60.

Figure 7:
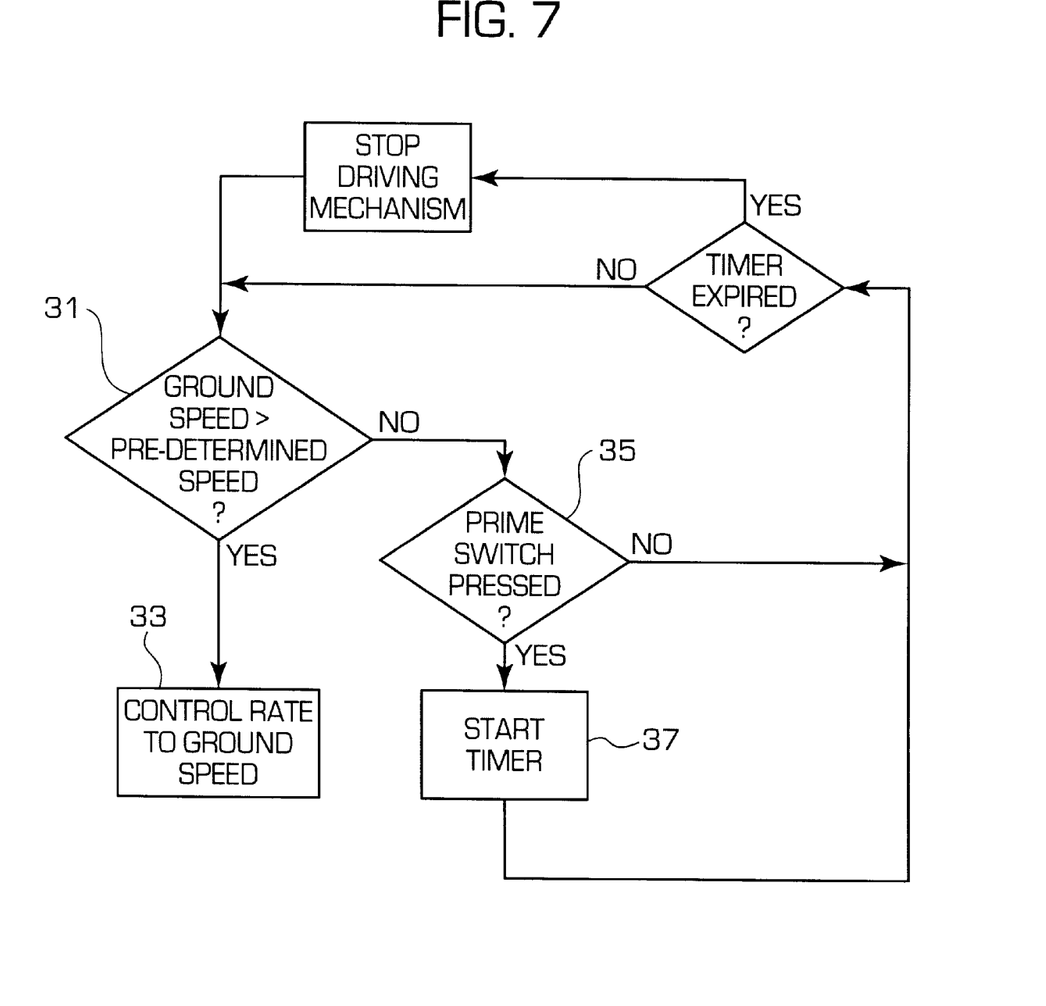
FIG. 7 is a flow chart showing the microcontroller function, as it applies to seeders and planters, in one embodiment of the invention.

FIG. 7 is flow chart showing the microcontroller 30 function as it applies to air seeders and planters, in one embodiment of the invention. At step 31, the microcontroller 30 determines whether the ground speed is greater than a predetermined minimum speed. If the ground speed is greater than the minimum speed, the driving mechanism 20 operates in its regular mode of operation 33, thus having a controlled rate 70 based on the detected ground speed. If the ground speed is zero, i.e., the cart is stationary, the microcontroller 30 allows the driving mechanism to operate in the bypass mode if the bypass mode is selected by an operator, by pressing prime buttons 35. After engaging the driving mechanism in the bypass mode, the operator waits for a predetermined length of time 37 during which the product is dispensed from the tank at a predetermined rate, into the air stream and carried through the distribution lines to the ground openers. After the predetermined length of time elapses, the tractor can begin travelling in the field and product is ready to be seeded. Afterwards, once the tractor starts travelling, product is seeded based on the predetermined rate selected by the operator from the user interface, at which the driving mechanism runs in the bypass mode.

In the bypass mode, the availability of product for seeding depends on the predetermined length of time during which product was metered from the tank into the distribution lines. Therefore, optimally, the predetermined length of time that the operator has to wait and the predetermined rate at which the driving mechanism runs in the bypass mode are related to each other. These quantities can be determined based on experience or can be calculated by taking into account factors such as: the amount of product necessary to fill the distribution lines, an average distance that the cart has to travel in order to reach the minimum ground speed, and the time for the metering mechanism to start operating in its regular mode.

According to the embodiment presented in FIG. 7, the driving mechanism 20 may operate in the bypass mode only when the ground speed is below the minimum speed. The driving mechanism 20 enters the regular mode 33 once the minimum ground speed is detected. However, it has to be understood that in other embodiments, the bypass mode can be selected any time by the operator, regardless of the ground speed.

For example, the driving mechanism can operate in the 'bypass mode' for a predetermined period of time measured from the moment when one or more primer buttons on the primer input unit 60 are activated, or for as long one or more primer buttons are pressed. It will be appreciated by a person skilled in the art that the selection of the 'bypass mode of operation' through activation means such as switches, levers or buttons on the primer input unit 60, can be achieved in numerous ways.

In one embodiment of the invention, the priming feature on an air cart works as follows: An AIR CART key and a MODE key are pressed at the same time on the user interface. A 10-second prime begins with the meters being turned at about 15 rotations/minute (rpm) provided that a meter switch is on and a master switch is on and hydraulic pressure is applied. The 10-second prime can be interrupted if ground speed is sensed or the master switch is turned off. As a person skilled in the art will easily recognize, the exact numerical values presented here are used only as an example, but any suitable other values can be used.

PLANTERS

Like the air seeders, planters have several tanks for holding seed or fertilizer, and an air distribution system comprising a series of hoses. Product travels through the hoses, entering through a series of inlets into several chambers for storing the product. In one embodiment, each chamber has joined to it a fingered singulator disk. Each chamber is located just above a corresponding ground opener. The singulator disk rotates such that as each finger passes the place where product puddles into the chamber, a single seed/fertilizer falls into the finger. The disk continues to rotate such that each subsequent finger can pick up product. The filled fingers pass a brush that eliminates the chance of multiple seeds being in a single finger. The filled fingers pass another opening in the disk when the product is dropped onto an elevator opening that carries the product to the ground opener.

The driving mechanism 20 of the planters can operate in a regular mode and a bypass mode, as previously discussed. FIGS. 6 and 7 apply to planters, as well as, seeders.

In the regular mode, the driving mechanism 20 of the planter is activated into rotating the singulator disk at the controlled rate output 70. In this mode, the controlled rate output 70 is a function of the operator settings and of the detected ground speed.

With respect to seeders, in the embodiment depicted in FIGS. 6 and 7, the operation in the regular mode is conditioned by the planter achieving a minimum ground speed.

In the bypass mode of operation, the operator can prime the singulator disk to rotate at a predetermined rate, regardless of the detected ground speed. The singulator disk is activated through a primer button on the user interface, in the cab of the vehicle towing the planter. On pushing the primer button, a bypass signal is sent to the controller to start rotating the disk at the predetermined rate. After engaging the bypass mode, the operator waits for a predetermined length of time during which product is singulated into the fingered disk and dropped into the elevator.

The bypass mode can be selected by the operator in any circumstance. A situation in which the use of the bypass mode is desirable is at the beginning of the planting process. In this case, while stationary, the operator engages the primer mechanism by pressing the primer button, then waits for a predetermined length of time during which the primer mechanism runs and product is being singulated into the fingered disk at a predetermined rate, and dropped into the elevator. When the planter begins travelling in the field, seed is ready to be planted through the ground openers.

In one embodiment of the invention, the priming feature on a planter works as follows: a PRIME switch is held on the switch box. The meters are turned at 15 rotations/minute (rpm) as long as the PRIME switch is held. As a person skilled in the art will easily recognize, the exact numerical value presented here is used only as an example, but any suitable other values can be used.

SPRAYERS

Figure 8:
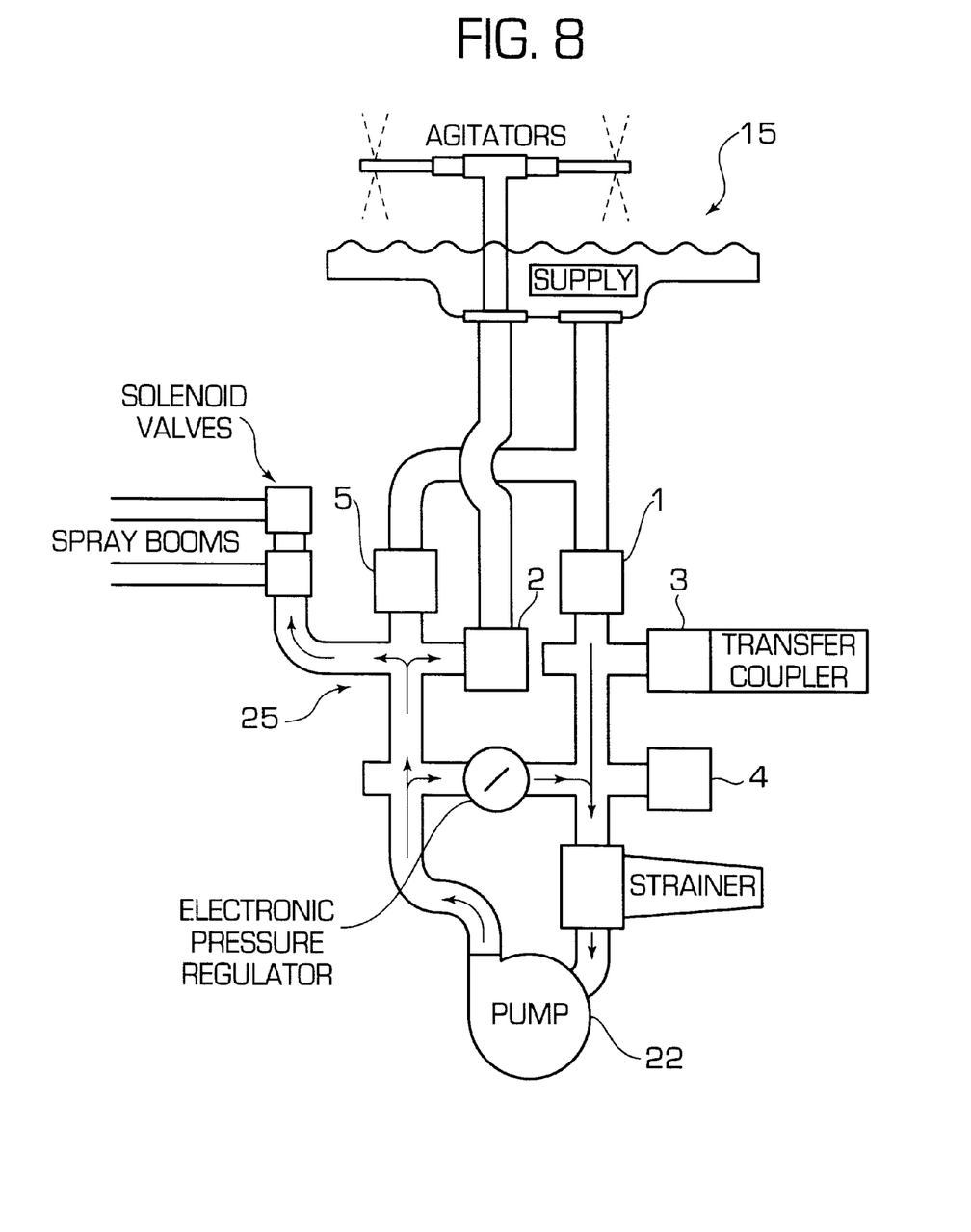
FIG. 8 represents a basic sprayer system.

Referring now to FIG. 8, a basic sprayer is depicted. Generally, a sprayer has at least one storage tank 15 for chemicals. In an embodiment of the invention, the tanks 15 contain a pre-mixed chemical ready for distribution. In an alternative embodiment, the tanks 15 store only water and, as the water travels through the distribution lines 25, the water is injected with the correct amount of chemical.

Figure 9:
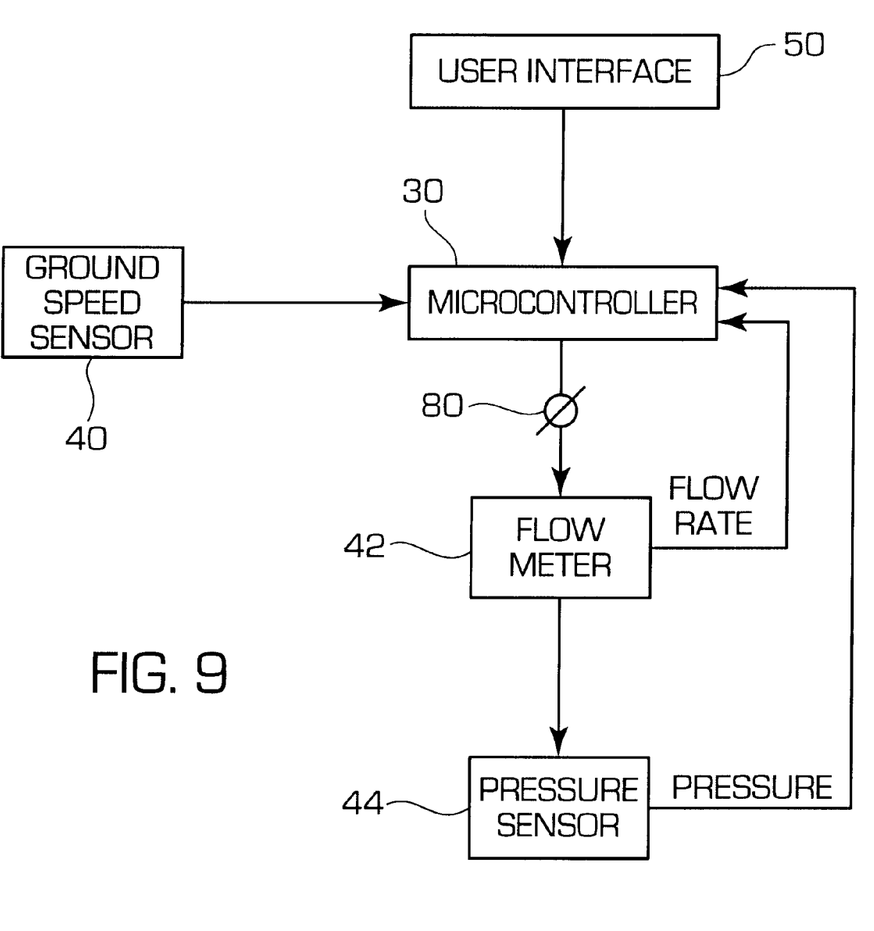
FIG. 9 is a block diagram of a primer system in accordance with an embodiment of the present invention, as it applies to sprayers.

Referring also to FIG. 9, The required gallons/acre ratio is known and programmed into a microcontroller 30, connected to the user interface 50 in the cab of the tractor towing the sprayer. The gallons/acre ratio is dependent upon the type of crop, the type of chemical, the position in the field, and the like. A pump 22 pushes the product into the distribution lines 25. As product is pushed into the distribution lines 25, it travels down at the flow rate necessary to dispense the required gallons/acre out of the nozzle on the spray bar. During this process, the entire system automatically remains pressurized at the appropriate level. The flow rate is dependent upon the ground speed of the sprayer.

The pump can be a centrifugal pump, in which fluid is fed into the center of a rotating pump impeller and is flung out to the impeller rim with considerable "centrifugal force" or pressure. The pressure is determined by the speed the pump impeller is turning, which is directly connected to a hydraulic motor shaft.

During a regular mode of operation, an autorate system ensures that the correct gallons/acre ratio is dispensed from nozzles, regardless of variations in the ground speed of the sprayer. Various autorate systems are available in the art, that are suitable for use with the present invention. In general, the autorate systems adjust the flow rate in the distribution lines 25, by adjusting the pressure level in the system. As depicted in FIG. 9, the actual flow rate is computed by the microcontroller 30 based on signals from the ground speed sensor 40, the user interface 50, a flow meter 42 and a pressure sensor 44. The flow meter 42 and the pressure sensor 44 are connected in a feedback loop with the microcontroller 30, informing the microcontroller 30 of the flow rate and of the pressure in the distribution lines, respectively, at any given moment.

A minimum ground speed is required, in order for the autorate system to work. Furthermore, the autorate system works only within a range of travel speeds which is limited by the nozzles. In an embodiment of the invention, when the speed falls out of this range, an alarm will sound to inform the operator.

In desired circumstances, the system can operate in a bypass mode. In this mode, a primer mechanism is selectively operated, and a predetermined flow rate, independent on the ground speed, is selected through the primer unit 60 on the user interface 50.

In the bypass mode, the primer feature pressurizes the distribution lines 25 of the sprayer at a predetermined pressure level, related to the predetermined flow rate that is selected. The predetermined pressure level is achieved by controlling a valve 80 in the distribution lines. The pressurized system starts the pump 22 and product travels at the desired flow rate. In an embodiment of the invention, the prime feature is engaged by holding a button on the primer unit 60, and is disengaged when the button is released. In an alternative embodiment, the operator could only activate the primer feature by pushing a button on the primer unit 60, and the mechanism would run by itself, controlled by a controller unit, for a predetermined length of time. In one embodiment of the invention, the priming feature on a sprayer works as follows: the operator can enter a prime set point in psi or kpascals; when a PRIME switch is held, the pressure is controlled to the operator set point; when the PRIME switch is released, control goes back to the normal controller.

Figure 10:
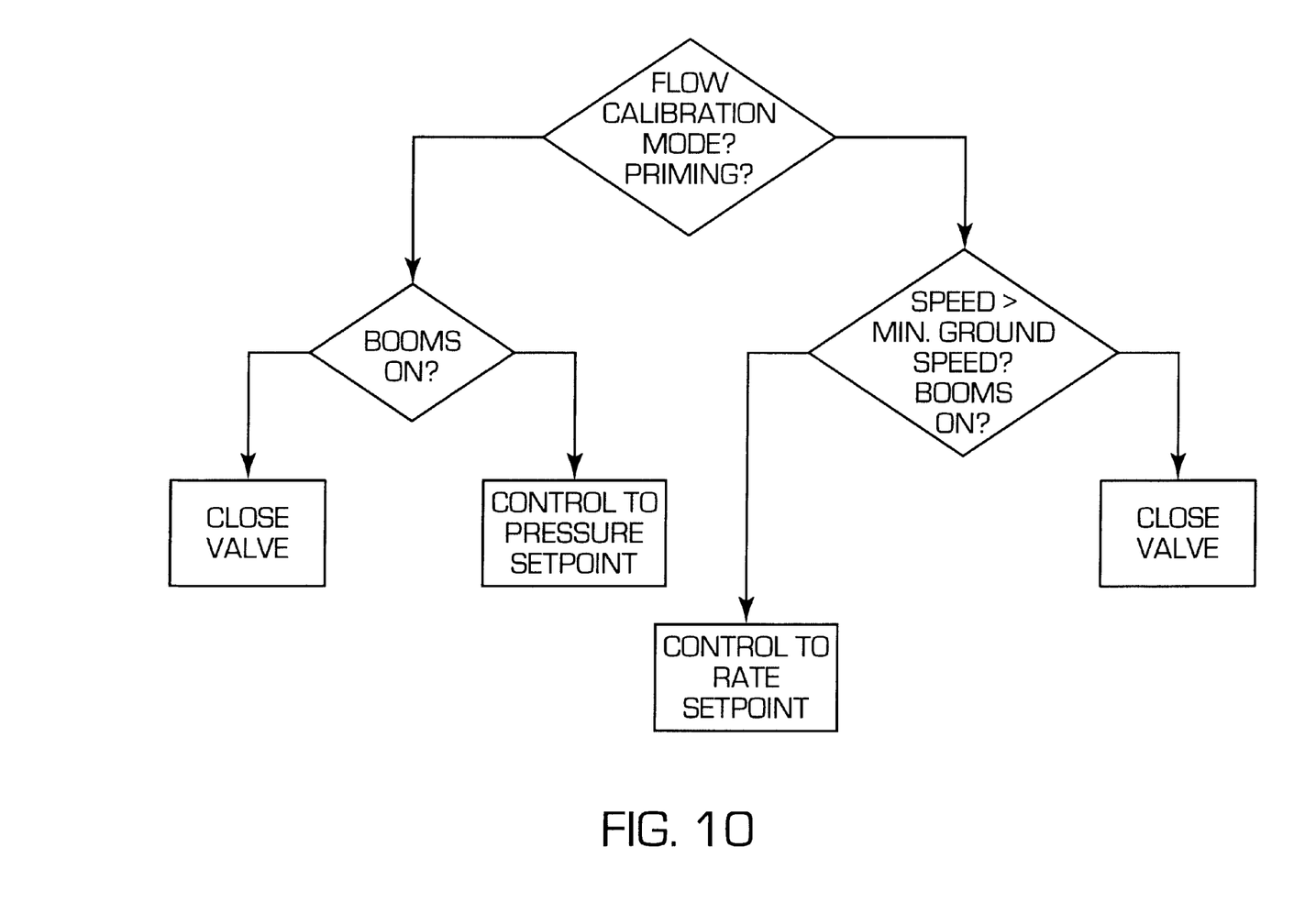
FIG. 10 is a flow chart showing the microcontroller function, as it applies to sprayers, in one embodiment of the invention.

FIG. 10 presents the microcontroller function in accordance with an embodiment of the invention, as it pertains to sprayers. The following features, as they relate to the invention and to FIG. 10, are defined:

Booms ON or OFF: The priming feature only works on boom sections of the sprayer, that have a corresponding switch turned on. Boom sections can be turned on or off at the operator's choice.

Flow Calibration Mode: This mode is entered by the operator, through the user interface.

Controlled Pressure Setpoint: The priming feature in this case controls the pressure in the system. The pressure setpoint indicates the pressure to which the controller will adjust the system. This value is entered at the user interface.

Controlled Rate Setpoint: In the regular operating mode, the sprayer applies a product at a given rate. The rate set point is the operator entered rate to which the controller will control the system.

Relating to FIG. 10, the sprayer has two controllers: a rate controller and a pressure controller. Depending on the mode chosen and switch settings (prime feature on or off), the sprayer will either control the system at a set pressure point or set rate point.

Referring now to all FIGS. 3–10, embodiments of the invention where described in detail for the case where a bypass mode was activated directly by an operator, via the primer unit 60 on the user interface 50. As previously mentioned in connection with FIG. 3, the bypass mode could also be activated when the microcontroller 30 receives bypass signals from other sensors 42, denoted herein as bypass sensors 42. The bypass sensors 42 may detect values of bypass parameter. When the bypass parameters attain certain values, the bypass system may be automatically triggered, without direct user intervention. One aspect of the invention contemplates the activation of the bypass mode based the microcontroller receiving a bypass signal from a sensor determining a predetermined height of an implement of an agricultural product distribution machine, relative to the ground.

Such an embodiment may operate as follows: the user, when in the field, commands the lowering of the implement from a transport position to a working position as per normal operation. The implement can be a tillage implement for air seeders, or a spray boom for a sprayers or a toolbar for planters. During lowering, when the implement reaches the predetermined height relative to the ground, the sensor sends a bypass signal to the microcontroller 30, leading to the activation of the driving mechanism in the bypass mode. The predetermined height is preferably calculated in advance such that by the time the implement is in full working position, the machine is fully primed and ready to begin working.

Numerous modifications, variations, and adaptations may be made to the particular embodiments of the invention described above without departing from the scope of the invention, which is defined in the claims.

Having thus described the invention, what is claimed is:

1. An agricultural product distribution machine comprising:
   a. storage means for storing a quantity of agricultural product to be distributed;
   b. conveying means for conveying agricultural product from the storage means to the ground surface; and
   c. control means for controlling the rate of transfer of the agricultural product from the storage means through the conveying means for distribution to the ground, the control means including:
      i. a regular operation system for automatically controlling the transfer of agricultural product at a rate dependent on process specific parameters;
      ii. a bypass system for controlling the transfer of agricultural product independent of a speed of movement of the machine relative to the ground; and
      iii. a user interface for inputting operator settings and comprising primer input means for activating the bypass system.

2. The agricultural product distribution machine of claim 1 wherein the bypass system controls the transfer of agricultural product after being activated, and until the speed of movement of the machine relative to the ground is more than a minimum speed.

3. An agricultural product distribution machine comprising:
   a. storage means for storing a quantity of agricultural product to be distributed;
   b. conveying means for conveying agricultural product from the storage means to the ground surface; and
   c. control means for controlling the rate of transfer of the agricultural product from the storage means through the conveying means for distribution to the ground, the control means including:
      i. a regular operation system for automatically controlling the transfer of agricultural product at a rate dependent on process specific parameters; and
      ii. a bypass system for controlling the transfer of agricultural product independent of a speed of movement of the machine relative to the ground wherein the bypass system includes a bypass sensor for detecting values of bypass parameters wherein the bypass parameters indicate when the activation of the bypass system is desirable.

4. The agricultural product distribution machine of claim 3 wherein the control means includes means coupled to a height sensor for activating the bypass system when the height of the conveying means relative to the ground is less than a predetermined height.

5. The agricultural product distribution machine of claim 1 wherein the primer input means comprises means for sending a bypass signal for activating the bypass system.

6. An air seeder comprising:
   a. storage means for storing a quantity of seed to be distributed;
   b. conveying means for conveying seed from the storage means to the ground surface; and
   c. control means for controlling the rate of transfer of the seed from the storage means through the conveying means for distribution to the ground, the control means including:
      i. a regular operation system for automatically controlling the transfer of seed at a rate dependent on process specific parameters; and
      ii. a bypass system for controlling the transfer of seed independent of a speed of movement of the air seeder relative to the ground, wherein the bypass system includes a bypass sensor for detecting values of bypass parameters wherein the bypass parameters indicate when the activation of the bypass system is desirable.

7. A precision planter comprising:
   a. storage means for storing a quantity of seed to be distributed;
   b. conveying means for conveying seed from the storage means to the ground surface; and
   c. control means for controlling the rate of transfer of the seed from the storage means through the conveying means for distribution to the ground, the control means including:
      i. a regular operation system for automatically controlling the transfer of seed at a rate dependent on process specific parameters; and
      ii. a bypass system for controlling the transfer of seed independent of a speed of movement of the precision planter relative to the ground, wherein the bypass system includes a bypass sensor for detecting values of bypass parameters wherein the bypass parameters indicate when the activation of the bypass system is desirable.

8. The agricultural product distribution machine of claim 1 wherein the bypass system controls the transfer of agricultural product after being activated, and until a period of time elapses.

9. The agricultural product distribution machine of claim 1 wherein the bypass system controls the transfer of agricultural product after being activated, and until the bypass system is no longer being activated by the primer input means.

10. The agricultural product distribution machine of claim 3 wherein the bypass system controls the transfer of agricultural product after being activated, and until the speed of movement of the machine relative to the ground is more than a minimum speed.

11. The agricultural product distribution machine of claim 3 wherein the bypass system controls the transfer of agricultural product after being activated, and until a period of time elapses.

* * * * *